United States Patent
Tokunaga et al.

(10) Patent No.: US 9,663,395 B2
(45) Date of Patent: May 30, 2017

(54) ALKALI-FREE GLASS AND ALKALI-FREE GLASS PLATE USING SAME

(71) Applicant: ASAHI GLASS COMPANY, LIMITED, Chiyoda-ku (JP)

(72) Inventors: Hirofumi Tokunaga, Chiyoda-ku (JP); Manabu Nishizawa, Chiyoda-ku (JP); Akio Koike, Chiyoda-ku (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 14/563,356

(22) Filed: Dec. 8, 2014

(65) Prior Publication Data

US 2015/0093561 A1   Apr. 2, 2015

Related U.S. Application Data

(63) Continuation of application No. PCT/JP2013/065613, filed on Jun. 5, 2013.

(30) Foreign Application Priority Data

Jun. 7, 2012   (JP) .................................. 2012-130267

(51) Int. Cl.
   *C03C 3/093*   (2006.01)
   *C03C 3/091*   (2006.01)
   *C03C 15/00*   (2006.01)

(52) U.S. Cl.
   CPC .............. *C03C 3/093* (2013.01); *C03C 3/091* (2013.01); *C03C 15/00* (2013.01)

(58) Field of Classification Search
   CPC .......... C03C 3/093; C03C 3/091; C03C 15/00
   See application file for complete search history.

(56) References Cited

U.S. PATENT DOCUMENTS

| | | | |
|---|---|---|---|
| 5,116,789 A | 5/1992 | Dumbaugh, Jr. et al. | |
| 6,537,937 B1 * | 3/2003 | Nishizawa | C03C 3/091 |
| | | | 501/66 |
| 2002/0013210 A1 | 1/2002 | Peuchert et al. | |
| 2010/0224589 A1 * | 9/2010 | Saijo | C09K 13/08 |
| | | | 216/24 |
| 2013/0244859 A1 | 9/2013 | Kawaguchi et al. | |
| 2014/0366581 A1 | 12/2014 | Tokunaga et al. | |

FOREIGN PATENT DOCUMENTS

| | | |
|---|---|---|
| CN | 101868428 A | 10/2010 |
| CN | 102417298 A | 4/2012 |
| CN | 104039727 A | 9/2014 |
| JP | 5-232458 | 9/1993 |
| JP | 08-034634 | 2/1996 |
| JP | 10-025132 | 1/1998 |
| JP | 2001-172041 | 6/2001 |
| JP | 2001-220172 | 8/2001 |
| JP | 2002-003240 | 1/2002 |
| JP | 2012-41217 | 3/2012 |
| JP | 2013-151407 A | 8/2013 |
| WO | WO2009/066624 | 5/2009 |

OTHER PUBLICATIONS

U.S. Appl. No. 14/561,399, filed Dec. 5, 2014, Nishizawa, et al.
International Search Report issued in corresponding PCT/JP2013/065613, mailed Sep. 17, 2013.
U.S. Appl. No. 14/541,484, filed Nov. 14, 2014, Tokunaga, et al.
U.S. Appl. No. 14/524,954, filed Oct. 27, 2014, Tokunaga, et al.
U.S. Appl. No. 14/524,880, filed Oct. 27, 2014, Tokunaga, et al.

* cited by examiner

*Primary Examiner* — Laura Auer
(74) *Attorney, Agent, or Firm* — Oblon, McClelland, Maier & Neustadt, L.L.P.

(57) ABSTRACT

The present invention relates to an alkali-free glass having a strain point of from 680 to 735° C., an average thermal expansion coefficient at from 50 to 350° C. of from $30 \times 10^{-7}$ to $43 \times 10^{-7}$/° C., and a specific gravity of 2.60 or less, and containing, indicated by mol % on the basis of oxides, $SiO_2$ 65 to 69%, $Al_2O_3$ 11.5 to 14%, $B_2O_3$ 3 to 6.5%, MgO 1 to 5%, CaO 7.5 to 12%, SrO 0 to 1%, BaO 0.5 to 6%, and $ZrO_2$ 0 to 2%.

24 Claims, No Drawings

ALKALI-FREE GLASS AND ALKALI-FREE GLASS PLATE USING SAME

TECHNICAL FIELD

The present invention relates to an alkali-free glass and an alkali-free glass plate using the same; and more detail, to an alkali-free glass that is suitable as a substrate glass for various displays and a substrate glass for a photomask, does not substantially contain an alkali metal oxide and is capable of being formed by a float process or an overflow down-draw process, and an alkali-free glass plate.

BACKGROUND ART

Heretofore, a glass used for a glass plate (glass substrate) for various displays, particularly glass plates on which surfaces a metal or oxide thin film is formed, has been required to have the following characteristics:
(1) Not substantially containing alkali metal ions; because in the case where the glass contains an alkali metal oxide, alkali metal ions diffuse in the thin film, resulting in deterioration of film characteristics.
(2) Having a high strain point so that deformation of a glass and shrinkage (thermal shrinkage) due to structure stabilization of the glass can be minimized when exposed to high temperature in a thin film formation step.
(3) Having sufficient chemical durability to various chemicals used in semiconductor formation; in particular, having durability to buffered hydrofluoric acid (BHF: mixed liquid of hydrofluoric acid and ammonium fluoride) for etching $SiO_x$ or $SiN_x$, a chemical solution containing hydrochloric acid used for etching of ITO, various acids (nitric acid, sulfuric acid, etc.) used for etching of an metal electrode, and an alkaline of a resist removing liquid.
(4) Having no defects (bubbles, striae, inclusions, pits, flaws, etc.) in the inside and on the surface.

In addition to the above requirements, the recent situations are as follows.
(5) Reduction in weight of a display is required, and the glass itself is also required to be a glass having a small density.
(6) Reduction in weight of a display is required, and a decrease in thickness of the substrate glass is desired.
(7) In addition to conventional amorphous silicon (a-Si) type liquid crystal displays, polycrystal silicon (p-Si) type liquid crystal displays requiring a slightly high heat treatment temperature have come to be produced (a-Si: about 350° C.→p-Si: 350 to 550° C.) and thermal resistance is required.
(8) In order to improve productivity and increase thermal shock resistance by increasing the rate of rising and falling temperature in heat treatment for preparation of a liquid crystal display, a glass having a small average thermal expansion coefficient is required.

On the other hand, small and medium-sized displays for mobile as typified by a smartphone have progressed in high definition and thus, the above demands have become more and more strict.

In addition, color unevenness caused due to the stress generated in the glass plate at the time when a display is fitted in a panel becomes problematic. In order to suppress the color unevenness, it is necessary to decrease the photoelastic constant of glass. For this, it is effective to decrease the concentration of $B_2O_3$ or increase the concentration of BaO in the glass. Alkali-free glass capable of realizing a low photoelastic constant by adjusting the composition in this manner has been proposed (for example, see Patent Documents 1 to 3).

On the other hand, in a field of small and medium-sized liquid crystal displays (LCD), organic EL displays (OELD), and particularly, portable displays such as a mobile, a digital camera and a mobile phone, reduction in weight and thickness of a display has become an important issue. For the purpose of realizing a further reduction in thickness of a glass plate, a process containing bonding an array color filter and then performing an 3 0 etching treatment on the surface of a glass plate to reduce the plate thickness (reduction in thickness of a plate), has been widely used.

PRIOR ART DOCUMENTS

Patent Documents

Patent Document 1: JP-A-2001-172041
Patent Document 2: JP-A-H5-232458
Patent Document 3: JP-A-2012-41217
Patent Document 4: JP-T-2009-066624

SUMMARY OF THE INVENTION

Problems that the Invention is to Solve

Patent Document 1 discloses an alkali-free glass having a low photoelastic constant, but the viscous properties at the devitrification temperature is low and there is a limitation in the production method thereof, or the low specific gravity and buffered hydrofluoric acid resistance (hereinafter, also referred to as "BHF resistance") cannot be achieved together.

Patent Document 2 discloses an alkali-free glass that contains 0 to 5 mol % of $B_2O_3$ and BaO, but the average thermal expansion coefficient thereof at from 50 to 300° C. exceeds $50 \times 10^{-7}$/° C.

Patent Document 3 discloses an alkali-free glass that contains 0.1 to 4.5% by mass of $B_2O_3$ and 5 to 15% by mass of BaO, but the average thermal expansion coefficient thereof at from 50 to 350° C. exceeds $43 \times 10^{-7}$/° C. and the specific gravity thereof exceeds 2.60.

As a method for reducing the thickness of a glass plate, for example, a method in which the surface of a glass plate having a plate thickness of 0.4 mm to 0.7 mm is subjected to an etching treatment (hereinafter, referred to as "hydrofluoric acid etching treatment") with an etchant containing hydrofluoric acid (HF) to be made into a glass plate having a plate thickness of 0.4 mm or less has been used (see Patent Document 4).

Alternatively, a method of forming a glass plate having a plate thickness of 0.4 mm or less by an overflow down-draw process and using the obtained glass has been examined.

An object of the present invention is to solve the above-described problems. That is, there is provided an alkali-free glass having a high strain point, a low specific gravity, a low photoelastic constant, and a high strength of a glass plate after the hydrofluoric acid etching treatment, is hardly deflected even though the thickness thereof is small, and hardly causes problems such as color unevenness even when stress is applied thereto; and an alkali-free glass plate made of the alkali-free glass.

Means for Solving the Problems

The present invention provides an alkali-free glass 1 having a strain point of from 680 to 735° C., an average thermal expansion coefficient at from 50 to 350° C. of from $30\times10^{-7}$ to $43\times10^{-7}/°$ C., and a specific gravity of 2.60 or less, and containing, indicated by mol % on the basis of oxides, $SiO_2$ 65 to 69%,
$Al_2O_3$ 11.5 to 14%,
$B_2O_3$ 3 to 6.5%,
MgO 1 to 5%,
CaO 7.5 to 12%,
SrO 0 to 1%,
BaO 0.5 to 6%, and
$ZrO_2$ 0 to 2%.

The present invention also provides an alkali-free glass 2 having a strain point of from 680 to 735° C., an average thermal expansion coefficient at from 50 to 350° C. of from $30\times10^{-7}$ to $43\times10^{-7}/°$ C., and a specific gravity of 2.60 or less, and containing, indicated by mol % on the basis of oxides, $SiO_2$ 65 to 69%,
$Al_2O_3$ 11.5 to 14%,
$B_2O_3$ 3 to 6.5%,
MgO 1 to 5%,
CaO 7.5 to 12%,
SrO exceeding 1% to 3%,
BaO 0.5 to 4%, and
$ZrO_2$ 0 to 2%.

The present invention further provides an alkali-free glass plate made of the above-mentioned alkali-free glass, in which a plate thickness is 0.4 mm or less, and at least one surface has been subjected to a hydrofluoric acid (HF) etching treatment by a depth of 5 μm or more from the surface.

Advantageous Effects of Invention

The alkali-free glass of the present invention has a high strain point, a low specific gravity, a low photoelastic constant, and a high strength after a hydrofluoric acid etching treatment, is hardly deflected even though the thickness thereof is small, and hardly causes problems such as color unevenness even when stress is applied thereto. Accordingly, the alkali-free glass can be used in a field of portable displays such as a small and medium-sized LCD, an OLED, and particularly, a mobile, a digital camera, and a mobile phone. Further, it can be used as a glass plate and is particularly suitable for an alkali-free glass plate having a plate thickness of 0.4 mm or less.

MODE FOR CARRYING OUT THE INVENTION

Hereinafter, the alkali-free glass of the present invention will be described.

Next, the composition range of respective components will be described.

In the case where $SiO_2$ is less than 65 mol % (hereinafter, simply referred to as %), there is a tendency that the strain point is not sufficiently increased, the average thermal expansion coefficient is increased, and the specific gravity is increased. It is preferably 65.5% or more, more preferably 66% or more, and still more preferably 66.5% or more. In the case of exceeding 69%, there is a tendency that the meltability of the glass is decreased, the Young's modulus is decreased, and the devitrification temperature is increased. It is preferably 68.5% or less, more preferably 68% or less, still more preferably 67.5% or less, and particularly preferably 67% or less.

$Al_2O_3$ increases the Young's modulus, suppresses deflection and phase-separation of the glass, decreases the average thermal expansion coefficient, increases the strain point, and improves the fracture toughness value to increase the glass strength. However, in the case of less than 11.5%, the effects are hardly exhibited and another component for increasing the average thermal expansion coefficient is required to be relatively increased, accordingly, the thermal expansion is likely to be increased. It is preferably 12% or more and more preferably 12.5% or more. In the case of exceeding 14%, the meltability of the glass becomes degraded, and in addition, there is a concern that the devitrification temperature is increased. It is preferably 13.5% or less, more preferably 13.2% or less, and still more preferably 13% or less.

$B_2O_3$ improves the BHF resistance and the melting reactivity of the glass, and decreases the devitrification temperature. However, in the case of less than 3%, the effects are hardly exhibited, and the BHF resistance is likely to be degraded. It is preferably 4% or more, more preferably 5% or more, and particularly preferably 5.5% or more. In the case of exceeding 6.5%, the photoelastic constant is increased and problems such as color unevenness easily occur when stress is applied thereto. Further, when the content of $B_2O_3$ is extremely large, the surface roughness becomes larger after the hydrofluoric acid etching treatment (hereinafter, also referred to as a "thinning treatment") and the strength after the thinning treatment is likely to be decreased. Further, the strain point thereof is also decreased. Consequently, it is preferably 6.3% or less and more preferably 6% or less.

Since MgO increases the Young's modulus without increasing the specific gravity, the problem of deflection can be alleviated by increasing the specific modulus so that the fracture toughness value is improved to increase the glass strength. In addition, it does not increase expansion among alkali earths, and also improves the meltability. However, in the case of less than 1%, the effects are hardly exhibited and the devitrification temperature tends to be problematic. It is preferably 1% or more, more preferably 2% or more, still more preferably 3% or more, and particularly preferably 4% or more. In the case of exceeding 5%, the devitrification temperature becomes increased, and devitrification tends to be problematic at the time of production of glass. It is preferably 4.7% or less and more preferably 4.5% or less.

CaO has characteristics that it increases the specific modulus, next to MgO, among alkali earths, does not increase the average thermal expansion coefficient, and does not allow the strain point to be extremely decreased. Further, CaO improves the meltability similarly to MgO, but it hardly increase the devitrification temperature compared to the case of MgO so that the devitrification is unlikely to be a problem at the time of production of glass. In the case of less than 7.5%, the effects are not exhibited and the devitrification temperature tends to be a problem. It is more preferably 7.8% or more and still more preferably 8% or more. In the case of exceeding 12%, the average thermal expansion coefficient is increased, the devitrification temperature is increased, and the devitrification tends to be a problem at the time of production of glass. It is preferably 10% or less, more preferably 9% or less, and still more preferably 8.5% or less.

SrO has characteristics that it improves the meltability without increasing the devitrification temperature of the glass and decreases the photoelastic constant. However, the effect is small compared to the case of BaO and the effect of increasing the specific gravity is larger than that. Accordingly, it is preferable that SrO be not largely contained.

Here, in the above-described alkali-free glass 1, when the content of SrO exceeds 1%, there is a concern that the specific gravity becomes large. In order to decrease the devitrification temperature, SrO is preferably substantially contained, and it is more preferably 0.1% or more, still more preferably 0.2% or more, and particularly preferably 0.5% or more.

Meanwhile, in the above-described alkali-free glass 2, when the content of SrO is 1% or less, there is a concern that the meltability is decreased and the devitrification temperature is increased. It is more preferably 1.5% or more. In the case of exceeding 3%, the specific gravity tends to be increased and the average thermal expansion coefficient tends to be increased. It is preferably 2.5% or less and more preferably 2% or less.

BaO has characteristics that it improves the meltability without increasing the devitrification temperature of the glass and decreases the photoelastic constant. However, when BaO is largely contained, the specific gravity becomes increased and the average thermal expansion coefficient tends to be increased.

Here, in the above-described alkali-free glass 1, when the content of BaO is less than 0.5%, there is a concern that the photoelastic constant is increased, the meltability is decreased, and the devitrification temperature is increased. It is preferably 1% or more, more preferably 1.5% or more, and still more preferably 2% or more. In the case of exceeding 6%, there is a concern that the specific gravity is increased and the average thermal expansion coefficient is increased. It is preferably 5% or less, more preferably 4% or less, still more preferably 3% or less, and particularly preferably 2.5% or less.

Meanwhile, in the above-described alkali-free glass 2, when the content of BaO is less than 0.5%, there is a concern that the photoelastic constant is increased, the meltability is decreased, and the devitrification temperature is increased. It is preferably 1% or more, more preferably 1.5% or more, and still more preferably 2% or more. In the case of exceeding 4%, there is a concern that the specific gravity is increased and the average thermal expansion coefficient is increased. It is preferably 3.5% or less, more preferably 3% or less, and still more preferably 2.5% or less.

$ZrO_2$ may be contained up to 2% in order to increase the Young's modulus, decrease the glass melting temperature, and accelerate crystal deposition at the time of firing. In the case of exceeding 2%, there is a tendency that the glass becomes unstable or a relative dielectric constant $\epsilon$ is increased. It is preferably 1.5% or less, more preferably 1.0% or less, still more preferably 0.5% or less, and particularly preferably substantially not contained.

Incidentally, the expression "not substantially contained" of the present invention means that materials other than unavoidable impurities mixed from raw materials or the like are not contained, that is, not contained intentionally.

When the total content of MgO, CaO, SrO, and BaO is less than 14%, there is a tendency that the photoelastic constant is increased and the meltability is decreased. It is more preferably 14.5% or more, still more preferably 14.8% or more, and particularly preferably 15% or more. When it exceeds 17%, a problem in that the average thermal expansion coefficient is difficult to decrease may occur. It is preferably 16% or less and more preferably 15.5% or less.

Alkali metal oxides such as $Na_2O$ and $K_2O$ are not substantially contained. For example, the content thereof is 0.1% or less.

Moreover, in order not to deteriorate properties of a thin film of a metal or an oxide provided on the surface of the glass plate at the time of production of a display using a glass plate made of the alkali-free glass of the present invention, it is preferable that the glass not substantially contain $P_2O_5$. Further, in order to facilitate recycle of the glass, it is preferable that the glass not substantially contain PbO, $As_2O_3$, and $Sb_2O_3$.

ZnO, $Fe_2O_3$, $SO_3$, F, Cl, and $SnO_2$ can be added to the glass in a total content of 5% or less for improving the meltability, the clarity, and the formability of the glass.

Production of the alkali-free glass and the alkali-free glass plate of the present invention are, for example, performed by the following procedures.

Raw materials of respective components are blended to make target components (the above-described alkali glass 1 and 2), continuously put into a melting furnace and heated at from 1,500 to 1,800° C. to be melted, thereby obtaining molten glass. An alkali-free glass plate can be obtained by forming the molten glass into a glass ribbon having a predetermined plate thickness in a forming apparatus, annealing the glass ribbon, and then cutting the glass ribbon.

In the present invention, it is preferable that a glass plate be formed by using a float method or an overflow down-draw method, particularly an overflow down-draw method. As described below, when the overflow down-draw method is used, the average cooling rate around the glass transition point is increased, the surface roughness of the surface on a side to which the hydrofluoric acid (HF) etching treatment is applied tends to be decreased, and the strength is easily improved.

In the present invention, it is preferable to form into a glass plate having a plate thickness of 0.7 mm or less. When the plate thickness is reduced, reduction in weight of a display can be easily achieved. In addition, since the drawing rate at the time of forming the glass plate becomes higher by reducing the plate thickness, the average cooling rate around the glass transition point is increased, the surface roughness of the surface on a side to which the hydrofluoric acid (HF) etching treatment is applied is easily decreased, and the strength is easily improved. The plate thickness is preferably 0.5 mm or less, more preferably 0.4 mm or less, still more preferably 0.35 mm or less, particularly preferably 0.25 mm or less, more particularly preferably 0.1 mm or less, and most preferably 0.05 mm or less. However, in the case where the plate thickness is less than 0.005 mm, a problem of self-weight deflection may occur in a device process to be performed at the time of production of a display in some cases, which is not preferable. When the self-weight deflection is particularly problematic, it is preferable that the plate thickness be 0.2 mm or more, and more preferable that the plate thickness be reduced by another method, for example, by performing a hydrofluoric acid (HF) etching treatment on a glass plate having a plate thickness of 0.4 mm or less to be thinned as described below.

It is preferable that the alkali-free glass plate of the present invention be subjected to the hydrofluoric acid (HF) etching treatment on at least one surface of the alkali-free glass plate made of alkali-free glass by a depth of 5 μm or more from the surface and preferable that the alkali-free glass plate be thinned by being etched by a depth of 5 μm or more with the hydrofluoric acid (HF) etching treatment. By reducing the plate thickness thereof with the etching treatment, it is possible to reduce the thickness of a display using the alkali-free glass plate (glass substrate) and to reduce the weight of the display.

When a thin plate, that is, an alkali-free glass plate having a small plate thickness is used from the beginning without reducing the plate thickness by the etching treatment, since a large and thin plate needs to be handled in a device preparation process or the like to be performed at the time of producing a display, problems such as a trouble in conveyance and a crack of the glass plate due to the self-weight deflection easily occur. In the present invention, it is preferable that the thickness is reduced by the etching treatment by a depth of 10 μm or more, more preferably by a depth of 100 μm or more and still more preferably by a depth of 200 μm or more.

In addition, in the present invention, the alkali-free glass plate whose thickness is reduced by the etching treatment is also referred to as an "alkali-free glass thin plate."

In the method of performing the hydrofluoric acid (HF) etching treatment on at least one surface of the alkali-free glass plate made of the alkali-free glass of the present invention, the plate thickness of the alkali-free glass plate (alkali-free glass thin plate) after the treatment is preferably 0.4 mm or less. In the case of exceeding 0.4 mm, the effects of reducing the weight or the thickness of a display may not be obtained. It is more preferably 0.35 mm or less, still more preferably 0.25 mm or less, particularly preferably 0.1 mm or less, and most preferable 0.05 mm or less. However, in the case of less than 0.005 nun, the alkali-free glass plate itself cannot be independent, which is not preferable.

Further, as long as the plate thickness of the alkali-free glass plate (alkali-free glass thin plate) after the etching treatment is 0.4 mm or less, the plate thickness of the alkali-free glass plate used for the etching treatment may be 0.4 mm or more or 0.4 mm or less.

In the etching treatment method of the alkali-free glass plate of the present invention, it is preferable that at least one surface of the alkali-free glass plate be subjected to the hydrofluoric acid (HF) etching treatment by a depth of 5 μm or more from the surface thereof. By performing the hydrofluoric acid (HF) etching treatment by a depth of 5 μm or more, the tip of the crack on the surface of the alkali-free glass plate, which is a cause of decrease in strength, becomes rounded and the strength thereof is improved. It is also preferable that the etching treatment be performed on the end portion (end surface) of the alkali-free glass plate.

The depth made by the hydrofluoric acid (HF) etching treatment on at least one surface of the alkali-free glass plate is more preferably 10 μm or more, still more preferably 30 μm or more, and particularly preferably 50 μm or more.

As a chemical solution for the etching treatment, a chemical solution containing hydrofluoric acid (HF) is used. Although the etching treatment can also be performed with an alkaline chemical solution, the chemical solution containing hydrofluoric acid has a higher etching rate and can perform etching smoothly. The concentration of hydrofluoric acid contained in the chemical solution is more preferably 1% by mass or more, still more preferably 3% by mass or more, and particularly preferably 5% by mass or more. Further, in addition to hydrofluoric acid, acids other than hydrofluoric acid, such as hydrochloric acid, nitric acid and sulfuric acid, are preferably added to the chemical solution.

At the time of the etching treatment, one surface of the alkali-free glass plate is immersed in the chemical solution containing hydrofluoric acid. The alkali-free glass plate is etching-treated (thinning-treated) in a predetermined amount by immersion thereof for a predetermined period of time depending on the concentration of hydrofluoric acid in the chemical solution.

In the etching treatment, the chemical solution is preferably allowed to flow by at least one method of stirring, bubbling, ultrasonic waves and showering. In place of allowing the chemical solution to flow, the alkali-free glass substrate may be moved by at least one method of oscillation and rotation.

In the etching treatment of the alkali-free glass plate of the present invention, the etching treatment is performed under such conditions that when immersed in 5% by mass hydrofluoric acid (HF) of 25° C., the elution amount per unit area and unit time, which gives an indication of the etching rate, becomes 0.17 $(mg/cm^2)$/min or more. In the case of less than 0.17 $(mg/cm^2)$/min, there is a concern that the time required for the reduction in thickness becomes too long. It is more preferably 0.18 $(mg/cm^2)$/min or more.

In the alkali-free glass plate treated by the etching treatment of the present invention, the surface roughness of the surface on the side having been subjected to the etching treatment is preferably 0.75 nm or less in Ra of a 1 μm square in AFM measurement. In the case of exceeding 0.75 nm, there is a concern that the strength of the alkali-free glass thin plate is decreased. It is more preferably 0.7 nm or less.

In addition, various patterns are formed on the alkali-free glass substrate of the present embodiment by using a photolithography technique or an etching technique. For example, a thin film transistor (TFT) or a color filter (CF) is formed. In the production process for such a liquid crystal panel, a glass substrate may be subjected to the etching treatment using buffered hydrofluoric acid (BHF).

The alkali-free glass substrate of the present embodiment has a haze value of 25% or less (preferably 20% or less and more preferably 15% or less) after immersion in a solution of 19BHF (50% of HF and 40% of $NH_4F$ are mixed in a ratio of 1 to 9) at 25° C. for 20 minutes.

Here, the haze value is a value indicating a turbidity and can be acquired as "Haze value H=S/T×100" where T represents a total transmittance of light radiated from a lamp and transmitted through a sample and S represents a transmittance of light scattered in the sample. These are defined in JIS K 7136 and can be measured by using a commercially available haze meter.

In the present invention, the alkali-free glass of the present invention has a strain point of from 680° C. to 735° C., so that thermal shrinkage at the time of producing a display using the alkali-free glass can be suppressed. It is more preferably 685° C. or higher, still more preferably 690° C. or higher, and particularly preferably 695° C. or higher. When the strain point is 700° C. or higher, it is suitable for a high strain point use (e.g., a substrate for a display or a substrate for illumination for an OLED, or a substrate for a display or a substrate for illumination of a thin plate having a plate thickness of 100 μm or less).

However, when the strain point of the alkali-free glass is extremely high, it is necessary to increase the temperature of a forming apparatus and thus, the lifetime of the forming apparatus tends to be shortened. Accordingly, the strain point of the alkali-free glass of the present invention is 750° C. or lower and preferably 735° C. or lower.

Moreover, for the same reason as the case of the strain point, the alkali-free glass of the present invention has a glass transition point of preferably 730° C. or higher, more preferably 735° C. or higher, and still more preferably 740° C. or higher.

In addition, the alkali-free glass of the present invention has an average thermal expansion coefficient at from 50 to 350° C. of from $30 \times 10^{-7}$ to $43 \times 10^{-7}$/° C., thereby thermal shock resistance and the productivity at the time of producing a display using the alkali-free glass can be improved. In the alkali-free glass of the present invention, it is preferably from $35 \times 10^{-7}$ to $40 \times 10^{-7}/°$ C.

Further, the alkali-free glass of the present invention has a specific gravity of preferably 2.60 or less, more preferably 2.59 or less, still more preferably 2.58 or less, and particularly preferably 2.56 or less.

Further, the alkali-free glass of the present invention has a specific modulus of 29 MNm/kg or more. In the case of less than 29 MNm/kg, problems such as a trouble in conveyance and a crack due to the self-weight deflection easily occur. It is more preferably 30 MNm/kg or more, still more preferably 30.5 MNm/kg or more, and particularly preferably 31 MNm/kg or more.

In addition, the alkali-free glass of the present invention has a Young's modulus of preferably 76 GPa or more, 77 GPa or more, 78 GPa or more, or 79 GPa or more.

Moreover, the alkali-free glass of the present invention has a photoelastic constant of preferably 31 nm/MPa/cm or less.

When the glass plate used for a display has birefringence due to the stress generated in production step of an LCD or at the time of using an LCD apparatus, a phenomenon that display of black turns to gray to decrease a contrast of the liquid crystal display is sometimes recognized. The phenomenon can be suppressed to a minimum by adjusting the photoelastic constant to be 31 nm/MPa/cm or less. It is more preferably 30.5 nm/MPa/cm or less, still more preferably 30 nm/MPa/cm or less, particularly preferably 29.5 nm/MPa/cm or less, and most preferably 29 nm/MPa/cm or less.

In consideration of the ease of securing another physical property, the photoelastic constant is preferably 26 nm/MPa/cm or more. The photoelastic constant can be measured at a measurement wavelength of 546 nm by a disk compression method.

In addition, the alkali-free glass of the present invention has a temperature $T_2$ at which viscosity $\eta$ reaches $10^2$ poise (dPa·s) of preferably $1,710°$ C. or lower, more preferably $1,700°$ C. or lower, and still more preferably $1,690°$ C. or lower. By satisfying the condition, melting becomes relatively easy.

In addition, the alkali-free glass of the present invention has a temperature $T_4$ at which the viscosity $\eta$ reaches $10^4$ poise (dPa·s) of preferably $1,330°$ C. or lower, more preferably $1,320°$ C. or lower, still more preferably $1,310°$ C. or lower, and particularly preferably $1,300°$ C. or lower.

In addition, the alkali-free glass of the present invention has a viscous property (devitrification viscosity) at the devitrification temperature of preferably $10^{4.5}$ poise or more. By satisfying the condition, devitrification at the time of forming by an overflow down-draw method is unlikely to be a problem. It is more preferably $10^{4.6}$ poise or more, still more preferably $10^{4.7}$ poise or more, particularly preferably $10^{4.8}$ poise or more, and more particularly preferably $10^5$ poise or more.

The devitrification temperature of the present invention is an average value between the maximum temperature at which crystals are deposited on the surface and in the inside of the glass and the minimum temperature at which crystals are not deposited, which are calculated by putting pulverized glass particles in a platinum plate, performing a heat treatment in an electric furnace whose temperature is controlled to be constant for 17 hours, and performing optical microscopic observation after the heat treatment is finished.

Further, in the alkali-free glass of the present invention, the average cooling rate around the glass transition point acquired by a rate cooling method is preferably $100°$ C./min or higher. In general, when the fictive temperature of the glass is low, it is known that density fluctuation becomes small but composition fluctuation becomes large. Reducing the density fluctuation contributes to stability of optical characteristics, but reduction in composition fluctuation is important with respect to mechanical physical properties. When the average cooling rate is low, the fictive temperature is decreased and the composition fluctuation of the glass becomes large. The present inventors found that when the average cooling rate is low, the surface roughness on the surface on a side to which the hydrofluoric acid (HF) treatment has been applied becomes large and the strength thereof is decreased.

The cooling rate of the glass is not temporary by the production process and varies depending on the temperature range. However, since the fictive temperature and the cooling rate of the glass obtained by cooling (rate cooling) from a high temperature at a constant cooling rate are in a linear relationship, the fictive temperature can be defined as a cooling rate at the time of the rate cooling instead. In the present invention, this is referred to as an average cooling rate around the glass transition point acquired by the rate cooling method. The average cooling rate around the glass transition point acquired by the rate cooling method is more preferably $200°$ C./min or higher and still more preferably $300°$ C./min or higher. However, in the case where the average cooling rate around the glass transition point acquired by the rate cooling method exceeds $1000°$ C./min, there is a concern that compaction becomes extremely large, which is not so preferable. It is more preferably $700°$ C./min or lower.

More specifically, the average cooling rate around the glass transition point acquired by the rate cooling method can be acquired by the following procedures. Experiments of holding glass at a temperature higher than the glass transition point by approximately $100°$ C. for 10 minutes, and then cooling at a constant cooling rate are performed at a cooling rate of $10°$ C./min, $30°$ C./min, $100°$ C./min, $300°$ C./min, and $1000°$ C./min. The relationship between the refractive index and the cooling rate can be obtained as a calibration curve by measuring the refractive index of the all glasses. Subsequently, the actual refractive index of a sample is measured and the cooling rate is acquired from the calibration curve.

EXAMPLES

Examples: examples 1 to 8, Comparative Examples: examples 9 and 10

Hereinafter, the present invention will be specifically described with reference to Examples and Production Examples, but the present invention is not limited to the Examples and Production Examples.

Raw materials of respective components were blended to make target compositions listed in Tables 1 and 2, and melted in a platinum crucible at a temperature of $1,600°$ C. for 1 hour. After the compositions were melted, it is allowed to flow out on a carbon plate, held at a temperature of the glass transition point $+100°$ C. for 10 minutes, and then cooled to room temperature at the cooling rate listed in Tables 1 and 2. The obtained glass is mirror-polished to obtain a glass plate, and various evaluations are performed.

[Measurement Method of Elution Amount Per Unit Area and Unit Time]

The mirror-polished alkali-free glass plate cut into 40 mm square is washed and the mass thereof is measured. The glass is immersed in 5% by mass of hydrofluoric acid at $25°$ C. for 20 minutes and then the mass after the immersion is measured. The surface area is calculated from the sample size, and the mass-decreased amount is divided by the surface area and further divided by the immersion time to calculate the elution amount per unit area and unit time.

[Measurement Method of Haze Value]

A test piece is immersed in a commercially available 19BHF solution (50% of HF and 40% of NH$_4$F are mixed in a ratio of 1 to 9) at 25° C. for 20 minutes and washed, and then a haze value H is evaluated by using a haze meter (HZ-2, manufactured by Suga Test Instruments Co., Ltd.).

The average thermal expansion coefficient, strain point, glass transition point, specific gravity, Young's modulus, $T_2$, $T_4$, devitrification temperature, devitrification viscosity, specific modulus, photoelastic constant (measurement wavelength: 546 nm), average cooling rate, and haze value of the glass in each example are listed in Tables 1 and 2. The physical property values are calculated values.

TABLE 1

| mol % | Ex. 1 | Ex. 2 | Ex. 3 | Ex. 4 | Ex. 5 |
|---|---|---|---|---|---|
| SiO$_2$ | 66.5 | 65.7 | 67.3 | 67.3 | 65.4 |
| Al$_2$O$_3$ | 12.7 | 13.3 | 13.1 | 13.1 | 12.5 |
| B$_2$O$_3$ | 6.4 | 5.9 | 4.3 | 4.3 | 6 |
| MgO | 2.2 | 1.2 | 4.3 | 4.4 | 4.6 |
| CaO | 7.6 | 11.1 | 8.3 | 9.8 | 7.8 |
| SrO | 0.2 | 0.2 | 0.3 | 0.3 | 0.3 |
| BaO | 4.4 | 2.6 | 2.4 | 0.8 | 2.4 |
| ZrO$_2$ | 0 | 0 | 0 | 0 | 1 |
| Average thermal expansion coefficient [×10$^{-7}$/° C.] | 38.9 | 39.8 | 37.4 | 36.6 | 36.5 |
| Strain point [° C.] | 688 | 696 | 706 | 707 | 688 |
| Glass transition point [° C.] | 727 | 742 | 758 | 765 | 734 |
| Specific gravity | 2.59 | 2.57 | 2.56 | 2.51 | 2.54 |
| Young's modulus [GPa] | 78.1 | 80.4 | 80.5 | 80.3 | 82.3 |
| T$_2$ [° C.] | 1690 | 1690 | 1700 | 1710 | 1683 |
| T$_4$ [° C.] | 1310 | 1300 | 1315 | 1305 | 1284 |
| Devitrification temperature [° C.] | 1170 | 1230 | 1255 | 1250 | 1150 |
| Devitrification viscosity log η [poise] | 5.1 | 4.7 | 4.7 | 4.7 | 5.3 |
| Photoelastic constant [nm/MPa/cm] | 29.0 | 29.2 | 28.6 | 29.2 | 29.5 |
| Average cooling rate [° C./min] | 250 | 250 | 120 | 500 | 500 |
| Haze value [%] | 1 | 1 | 13 | 13 | 10 |

TABLE 2

| mol % | Ex. 6 | Ex. 7 | Ex. 8 | Ex. 9 | Ex. 10 |
|---|---|---|---|---|---|
| SiO$_2$ | 66.5 | 67.3 | 68 | 66.5 | 66.5 |
| Al$_2$O$_3$ | 12.7 | 12.7 | 12.7 | 12.7 | 12.7 |
| B$_2$O$_3$ | 6.4 | 4.8 | 3.5 | 6.4 | 6.4 |
| MgO | 2.5 | 2.8 | 4.4 | 1.6 | 0.7 |
| CaO | 8.3 | 8.6 | 9.2 | 7.2 | 7.2 |
| SrO | 2.2 | 1.2 | 0.6 | 1.2 | 0.2 |
| BaO | 1.4 | 2.6 | 1.6 | 4.4 | 6.3 |
| ZrO$_2$ | 0 | 0 | 0 | 0 | 0 |
| Average thermal expansion coefficient [×10$^{-7}$/° C.] | 37.9 | 39.0 | 37.8 | 39.7 | 41.0 |
| Strain point [° C.] | 688 | 701 | 711 | 688 | 689 |
| Glass transition point [° C.] | 738 | 750 | 767 | 727 | 720 |
| Specific gravity | 2.53 | 2.57 | 2.55 | 2.61 | 2.66 |
| Young's modulus [GPa] | 78.4 | 79.7 | 80.4 | 78.4 | 78.4 |
| T$_2$ [° C.] | 1695 | 1700 | 1710 | 1690 | 1685 |
| T$_4$ [° C.] | 1310 | 1320 | 1320 | 1320 | 1325 |
| Devitrification temperature [° C.] | 1160 | 1230 | 1265 | 1160 | 1150 |
| Devitrification viscosity log η [poise] | 5.4 | 4.8 | 4.7 | 5.3 | 5.3 |
| Photoelastic constant [nm/MPa/cm] | 30 | 28.8 | 28.5 | 28.9 | 28.3 |
| Average cooling rate [° C./min] | 380 | 380 | 120 | 250 | 250 |
| Haze value [%] | 1 | 8 | 23 | 1 | 1 |

The glasses in Examples 9 and 10 do not correspond to any of the above-described alkali-free glasses 1 and 2 and the specific gravity is high because SrO and BaO are largely contained.

[Evaluation of Surface Roughness by AFM]

With respect to the etching treatment surface of the alkali-free glass plate, a surface roughness Ra per 1 μm square is acquired by using XE-HDM (manufactured by Park Systems Corporation) at the scan rate of 1 Hz.

With respect to the alkali-free glass in Example 1, after holding at 840° C. for 1 hour, an alkali-free glass plate which is cooled at 50° C./min and an alkali-free glass plate which is cooled at 500° C./min are prepared. These alkali-free glass plates are mirror-polished, and then, the thickness thereof is reduced by subjecting one surface of the alkali-free glass plate to an etching treatment by a mixed acid made of 8% by mass of hydrofluoric acid and 10% by mass of hydrochloric acid such that the plate thickness thereof becomes 0.2 mm from 0.3 mm while bubbling is performed. When the surface roughness Ra per 1 μm square of the obtained alkali-free glass thin plate is acquired by AFM measurement, the values are respectively 0.78 nm and 0.68 nm.

When the surface strength of the respective alkali-free glass thin plates is acquired by four-point bending, the glass which has been cooled at 500° C./min has strength higher than that of the glass which has been cooled at 50° C./min.

The present invention has been described in detail with reference to specific embodiments thereof, but it will be apparent to one skilled in the art that various modifications and changes can be made without departing the scope and spirit of the present invention.

The present application is based on Japanese Patent Application No. 2012-130267 filed on Jun. 7, 2012, and the contents of which are incorporated herein by reference.

INDUSTRIAL APPLICABILITY

According to the present invention, it is possible to provide an alkali-free glass which has a high strain point, a low specific gravity, a low photoelastic constant, and a high strength after the hydrofluoric acid etching treatment, is hardly deflected even though the thickness thereof is small, and hardly causes problems such as color unevenness even when stress is applied thereto; and an alkali-free glass plate made thereof.

The invention claimed is:

1. An alkali-free glass having a strain point of from 685 to 735° C., an average thermal expansion coefficient at from 50 to 350° C. of from 35×10$^{-7}$ to 43×10$^{-7}$/° C., a specific gravity of 2.60 or less, a temperature $T_2$ at which viscosity η reaches 10$^2$ poise (dPa.s) of 1,710° C. or lower, and a photoelastic constant of 30 nm/MPa/cm or less, and comprising, indicated by mol % on the basis of oxides, SiO$_2$ 65 to 69%,
Al$_2$O$_3$ 11.5 to 14%,
B$_2$O$_3$ 3 to 6.5%, MgO 1 to 5%,
CaO 7.5 to 12%,
SrO 0 to 1%,
BaO 0.5 to 6%, and
$ZrO_2$ 0 to 2%.

2. An alkali-free glass having a strain point of from 680 to 735° C., an average thermal expansion coefficient at from 50 to 350° C. of from $35\times10^{-7}$ to $43\times10^{-7}$/° C., and a specific gravity of 2.60 or less, and comprising, indicated by mol % on the basis of oxides,
$SiO_2$ 65 to 69%,
$Al_2O_3$ 11.5 to 14%,
$B_2O_3$ 3 to 6.5%,
MgO 1 to 5%,
CaO 7.5 to 12%,
SrO from greater than 1% to 3%,
BaO 0.5 to 4%, and
$ZrO_2$ 0 to 2%.

3. The alkali-free glass according to claim 1, having a viscosity at a devitrification temperature of $10^{4.5}$ poise or more.

4. The alkali-free glass according to claim 1, having an average cooling rate around a glass transition point acquired by a rate cooling method of 100° C./min or higher.

5. An alkali-free glass plate made of the alkali-free glass according to claim 1,
wherein a plate thickness is 0.4 mm or less, and
at least one surface has been subjected to a hydrofluoric acid (HF) etching treatment by a depth of 5μm or more from the surface.

6. The alkali-free glass according to claim 2, having a photoelastic constant of 31 nm/MPa/cm or less.

7. The alkali-free glass according to claim 2, having a viscosity at a devitrification temperature of $10^{4.5}$ poise or more.

8. The alkali-free glass according to claim 2, having an average cooling rate around a glass transition point acquired by a rate cooling method of 100° C./min or higher.

9. An alkali-free glass plate made of the alkali-free glass according to claim 2,
wherein a plate thickness is 0.4 mm or less, and
at least one surface has been subjected to a hydrofluoric acid (HF) etching treatment by a depth of 5μm or more from the surface.

10. The alkali-free glass according to claim 1, comprising from 8 to 12% of CaO, indicated by mol % on the basis of oxides.

11. The alkali-free glass according to claim 2, comprising from 8 to 12% of CaO, indicated by mol % on the basis of oxides.

12. The alkali-free glass according to claim 1, comprising from 8.3 to 12% of CaO, indicated by mol % on the basis of oxides.

13. The alkali-free glass according to claim 2, comprising from 8.3 to 12% of CaO, indicated by mol % on the basis of oxides.

14. The alkali-free glass according to claim 2, comprising from 1.5 to 3% of SrO, indicated by mol % on the basis of oxides.

15. The alkali-free glass according to claim 1, comprising from 3 to 5.5% of $B_2O_3$.

16. The alkali-free glass according to claim 1, comprising from 1 to 6% of BaO.

17. The alkali-free glass according to claim 1, wherein the average thermal expansion coefficient at from 50 to 350° C. of from $35\times10^{-7}$ to $40\times10^{-7}$/° C.

18. The alkali-free glass according to claim 2, wherein the average thermal expansion coefficient at from 50 to 350° C. of from $35\times10^{-7}$ to $40\times10^{-7}$/° C.

19. The alkali-free glass according to claim 1, wherein the strain point is from 690 to 735° C.

20. The alkali-free glass according to claim 2, wherein the strain point is from 690 to 735° C.

21. The alkali-free glass according to claim 1, wherein the temperature T2 is from 1700° C. or lower.

22. The alkali-free glass according to claim 2, wherein the temperature T2 is from 1700° C. or lower.

23. The alkali-free glass according to claim 1, wherein the total content of MgO, CaO, SrO, and BaO is 14 mol % or more.

24. The alkali-free glass according to claim 2, wherein the total content of MgO, CaO, SrO, and BaO is 14 mol % or more.

* * * * *